United States Patent
Knopp et al.

(12)

(10) Patent No.: US 6,487,579 B1
(45) Date of Patent: Nov. 26, 2002

(54) PROCESS FOR COORDINATING THE COURSE OF COOPERATING PROCESSES WHICH ACCESS A COMMON OBJECT

(75) Inventors: Jürgen Knopp, Neubiberg (DE); Matthias Reich, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/171,317
(22) PCT Filed: Apr. 15, 1997
(86) PCT No.: PCT/DE97/00753
§ 371 (c)(1),
(2), (4) Date: Oct. 15, 1998
(87) PCT Pub. No.: WO97/39405
PCT Pub. Date: Oct. 23, 1997

(30) Foreign Application Priority Data

Apr. 15, 1996 (DE) .......................................... 196 14 840

(51) Int. Cl.$^7$ .................................................. G06F 9/00
(52) U.S. Cl. ........................ 709/104; 709/225; 713/167
(58) Field of Search ................................. 709/100, 225; 380/4; 713/167

(56) References Cited

U.S. PATENT DOCUMENTS 5,404,529 A * 4/1995 Chernikoff et al. ......... 709/315
5,680,452 A * 10/1997 Shanton ...................... 713/167

OTHER PUBLICATIONS

Butler et al., "Monitors, Messages, and Clusters: The P4 Parallel Programming System", Parallel Computing 20, 1994, pp. 547–564.

M. Herlihy et al., "A Value Transmission Method for Abstract Data Types", ACM Transactions on Programming Languages and Systems, vol. 4, No. 4, 1982, pp. 527–551.

A. Black et al., "Distribution and Abstract Types in Emerald", IEEE Transactions on Software Engineering, vol. SE–13, No. 1, Jan. 1987, pp. 65–76.

H. Bal et al., "Object Distribution in Orca Using Compile–Time and Run–Time Techniques", ACM Sigplan Notices, No. 10, New York, pp. 162–177.

J. Knopp et al., "A Data Model for Architecture Independent Parallel Programming", pp. 34–40.

Parallel Processing: Conpar 94—VAPP VI, 1994, S. Lüpke, "Accelerated Access to Shared Distributed Arrays on Distributed Memory Systems by Access Objects", pp. 449–460.

N. Gehani, "Capsules: A Shared Memory Access Mechanism for Concurrent C/C++", IEEE Transactions on Parallel and Distributed Systems, No. 7, 1993, pp. 795–811.

* cited by examiner

*Primary Examiner*—Majid Banankhah
(74) *Attorney, Agent, or Firm*—Staas & Halsey LLP

(57) ABSTRACT

A coordinator object that contains access patterns indicating the sequences of accesses of the cooperating processes to the object is allocated to the common object. The coordinator object controls the accesses to the object requested by the processes with the assistance of the access patterns. The change from one access type to another access type ensues dependent on a switch condition that can be set. The switch condition is met when all accesses of a group of processes with respect to an access type or when a predetermined plurality of specific accesses have been implemented. The goal of the method is to coordinate the parallel processing of processes in a multi-processor system both given common address space as well as given distributed address space.

23 Claims, 4 Drawing Sheets

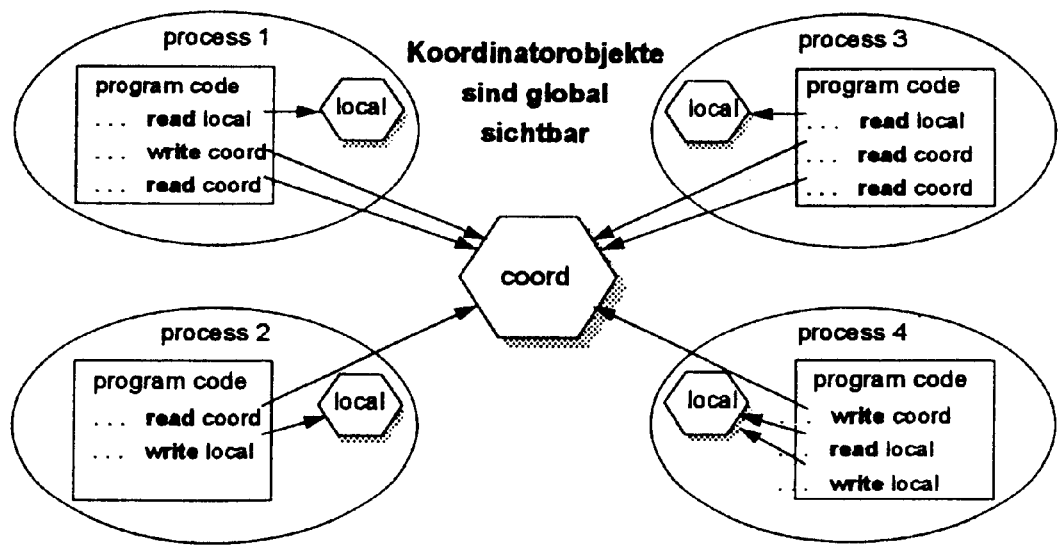
Figur 1
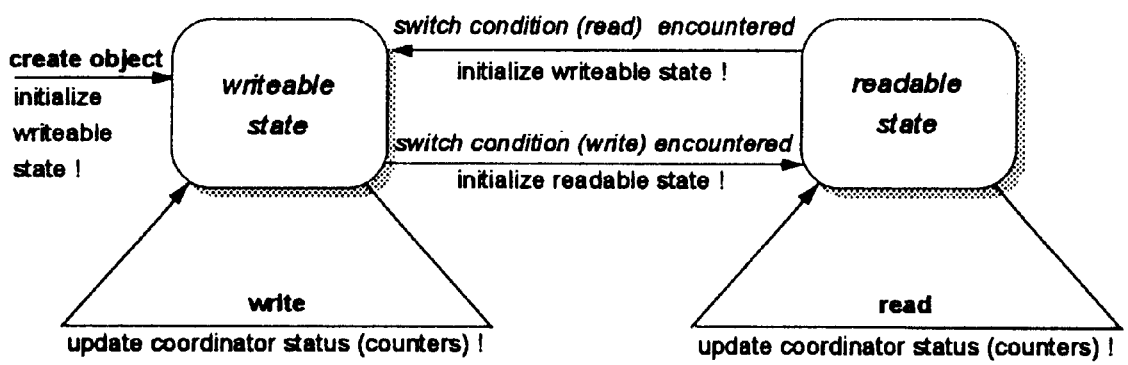
Figur 2

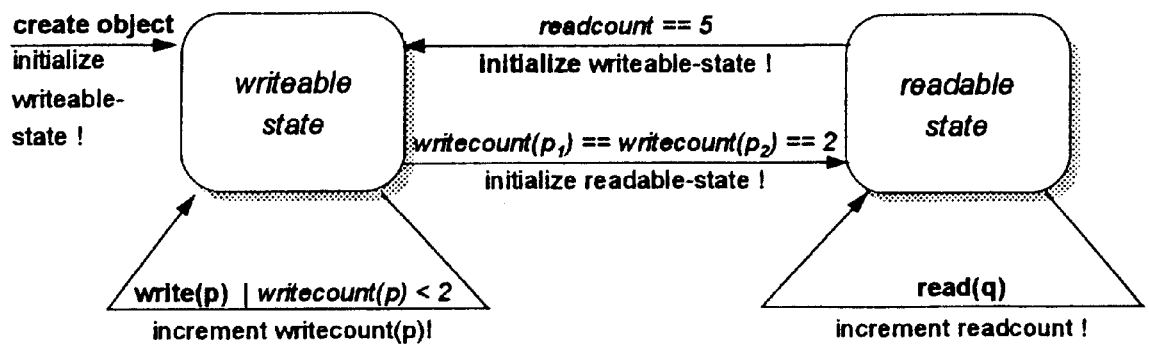
Figur 3
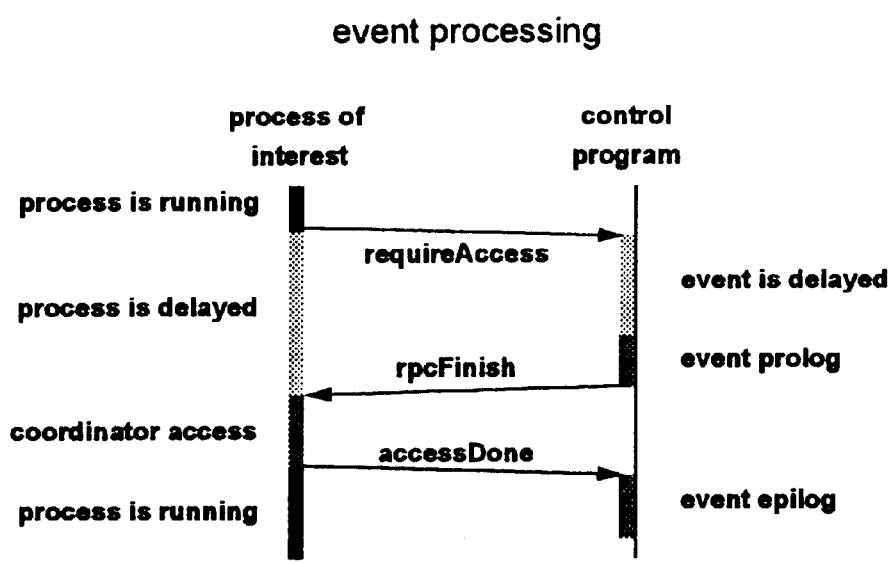
Figur 4

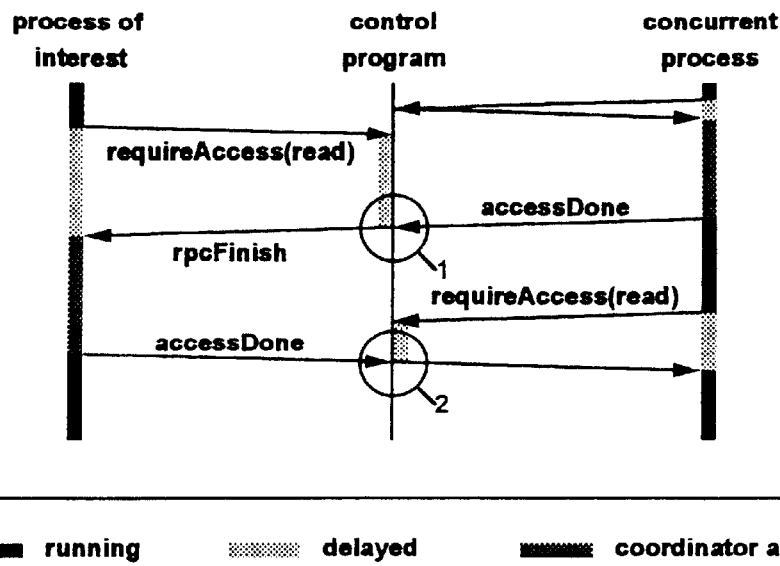
Figur 5
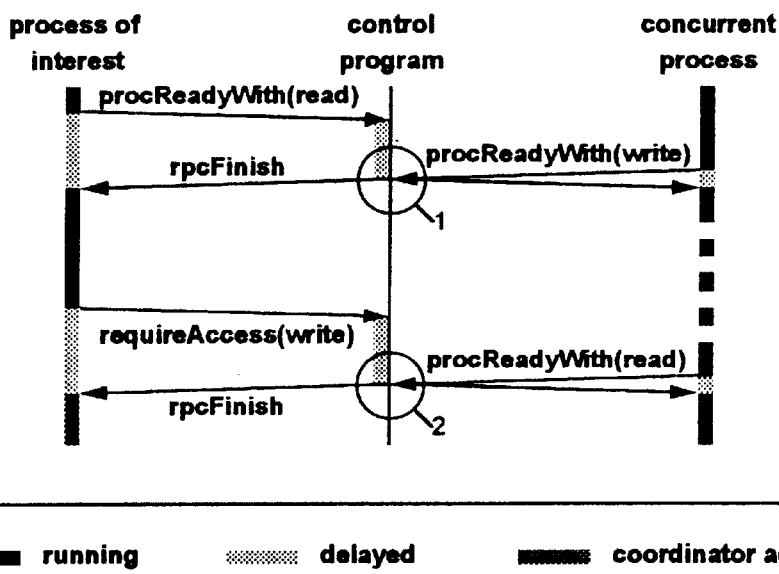
Figur 6

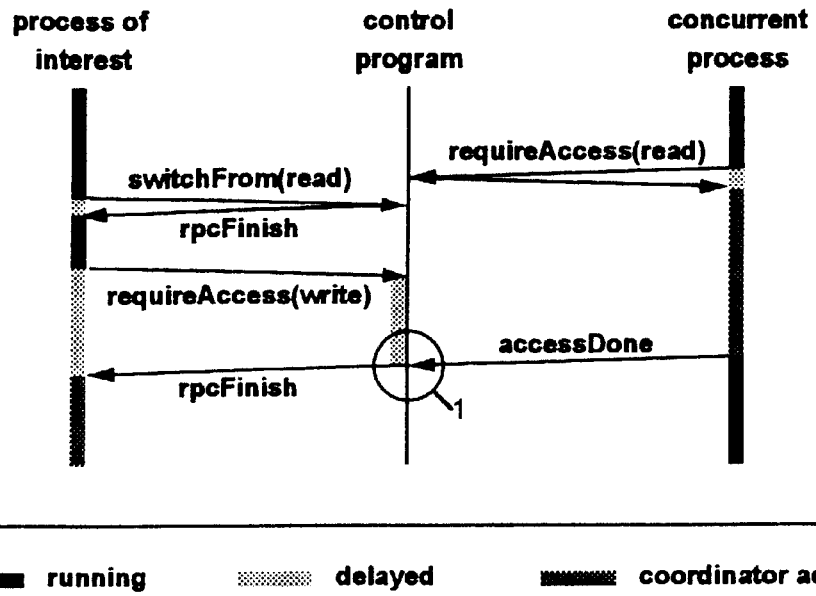
swithFrom
Figur 7
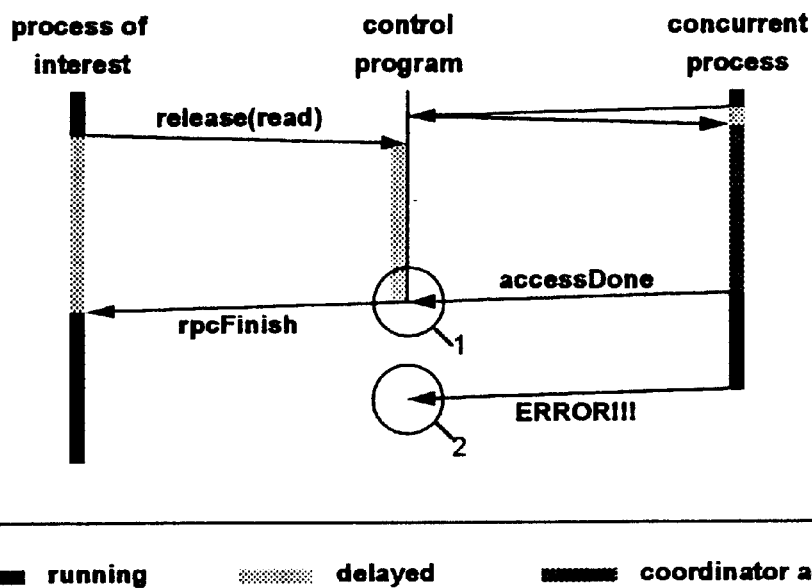
release
Figur 8

PROCESS FOR COORDINATING THE COURSE OF COOPERATING PROCESSES WHICH ACCESS A COMMON OBJECT

BACKGROUND OF THE INVENTION

1. Field of the Invention

The present invention relates generally to a method for coordinating the execution of cooperating processes that access a common object in a parallel processing environment.

2. Description of the Related Art

Explicit parallel programming is characterized in that the programmer must specify how a plurality of cooperating processes coordinate their execution. Dependent on the computer architecture used, this coordination occurs by:

Synchronization in the case of processes with a common address space. Synchronization prevents common data from being accessed at the wrong time.

Communication between processes with distributed address space. Communication makes data between such processes available (at the right time).

In order to utilize the advantages of these two computer architectures, either communication (for distributed architectures) or synchronization (for architectures with a common address space) is offered as programming means in parallel programming models and parallel programming languages.

The support of what is referred to as the distributed shared memory is known from Bill Nitzberg, Virginia Lo: Distributed Shared Memory: A Survey of issues and Algorithms IEEE COMPUTER, vol. 24, no. Aug. 8, 1991 and is based on the fiction that an inaccessible memory can be accessed (automatic data migration then occurs). There is a great number of programming models for distributed memories in addition to this general operating system approach that refine this idea. For example, Emerald as disclosed in Distribution and Abstract Types in Emerald, IEEE Transactions on Software Engineering SE 13, Jan. 1, 1987 distinguishes between reading and writing. In reading or writing accesses, objects are migrated according to obvious semantics onto the machine that needs them. None of these approaches is conceived for shared memories. An overview of these and similar models or, respectively, languages can be found in H. Bal, J. Steiner, A. Tanenbaum: Programming Languages for Distributed Computing Systems ACM Computing Surveys, September 1989

SUMMARY OF THE INVENTION

An object underlying the invention is comprised in providing a method that enables a uniform programming model for both synchronization and communication architectures. This and other objects and advantages of the invention are achieved by a method for coordinating the execution of processes cooperating with one another that access a common object, wherein: each common object is declared as coordinator object and access patterns that determined sequences of accesses of the cooperating processes onto the coordinator object are allocated to it; a sequence of types of access (access types) is recited in the access pattern; given execution of the processes, the coordinator object determines whether an access to the common object is present and, in this case, determines on the basis of the access pattern whether the access can be implemented or must be postponed until the access of another process has ended.

With the assistance of what are referred to as coordinator objects, the method can replace explicit coordination commands with a static declaration of allowable sequences of accesses, as a result whereof the dynamic executive behavior of the cooperating processes can be influenced. This approach of parallel programming leads to more comfort and portability than in conventional parallel programming without deteriorating the efficiency. Coordinator objects, thus, are passive objects on which the active processes operate.

Identical accesses are referred to with the term access type below. For example, writing accesses belong to one access type, reading accesses to another access type.

The underlying idea of the coordinator objects is thereby as follows: Parallel programmers indicate access patterns for commonly used objects (data). An access pattern describes what sequences of accesses of the cooperating processes to a common object are possible. This shall be explained with reference to writing and reading accesses to a common object. In this case, a distinction can be made between writing and reading accesses and objects that are ready to be read after which writing accesses can be specified. Conversely, objects that are again ready to be written after which reading accesses can also be specified. The patterns can generally be defined by counters that either log the accesses of all processes in common or the accesses of each individual process.

Corresponding to the indicating access patterns, a program behavior arises that implicitly leads to synchronization or communication (triggered by specific access sequences). For example, writing operations are delayed in the read status (i.e. the corresponding processes are put to sleep, ie., temporarily halted). When switching into the write status, the sleeping processes are awakened; they then behave exactly as though they had not yet even attempted their access. The behavior is oppositely identical in the write access. This execution usually occurs iteratively, i.e. the writing and the reading status alternate repeatedly with one another.

The critical idea of the coordinator objects is thus that a run time behavior that is characterized by automatic synchronization or communications is achieved by a priori indicated properties of objects. Accesses to coordinator objects modify the normal program behavior insofar as memory accesses can be delayed—or, expressed differently: Corresponding to the specified access patterns, processes are blocked given accesses to coordinator objects and are re-awakened at a suitable point in time.

Developments of the invention are provided when the access pattern specifies whether a plurality of accesses per access type are handled with priority before an access of another access type. Preferably, the accesses of an access type are implemented in strict succession in order to avoid conflicts. The coordinator object can be informed that no instances of conflict occur given successive processing of the accesses of one access type, so that the accesses need not be strictly implemented. The number of accesses per access type are, in one embodiment, counted with a counter and an access of another process or of another access type is allowed when the allowable number of accesses per access type is reached. One access type covers writing accesses and the other access type covers reading accesses. In a preferred embodiment, the coordinator object can switch into the write status or into the read status, and the initial status is a write status. The switching of the coordinator object from one status into the other status is initiated by a switch condition that can be set by a keyword. The switch condition can be set such that a plurality of accesses of one access type must be met. Alternately, the switch condition can be set such that a total number of accesses by different processes must be met. Yet another alternative, the switch condition can be set such that the accesses of a group of processes must be met. The switch condition is determined by the process.

The coordinator object is realized as a central control program that is specified dependent on respective application. The control program administers accesses that cannot be processed yet in a waiting set. A waiting set is generated in the control program for each access type. The next access to be processed can be selected from a waiting set. Preferably, one waiting queue is prioritized, so that the accesses of this waiting queue are processed first.

In general, a local memory that cannot be addressed by other processes is allocated to each process. Given distributed memory, the control program sees to it for processes for which access is allowed that data consistent with the coordinator data are stored in their local memory.

BRIEF DESCRIPTION OF THE DRAWINGS

The invention is explained in greater detail on the basis of exemplary embodiments.

FIG. 1 is a schematic illustration of the coordination of processes;

FIGS. 2 and 3 are schematic illustrations of the functioning of the coordinator objects when a plurality of processes access a common object; and FIGS. 4–8 are diagrams which show examples of access patterns and their implementation in the coordinator object.

DETAILED DESCRIPTION OF THE PREFERRED EMBODIMENTS

1. The Underlying Memory Model

The explanation of the coordinator objects is based on a memory model having the following properties: Each process has a local memory.

Accesses to this memory by foreign processes are in fact possible given a common address space but the accesses of different processes are uncoordinated (i.e. unsynchronized) insofar as synchronization is not explicitly carried out.

given a distributed address space, direct memory accesses by foreign processes are not possible at all.

For the purpose of a uniform programming model, it is therefore assumed that local memory accesses exclusively relate to process-local data, i.e. that communication or, respectively, data exchange is realized via local memory accesses.

Coordinator objects represent the sole exception. As a result of these, global objects that are visible for every involved process are made available to the programmer. Over and above this, a coordination of all accesses to these global objects is compelled. Both local as well as global objects can thus be both read as well as written. The memory model is illustrated by FIG. 1. The four processes 1–4 can access the common coordinator object coord. It can be seen that the processes can access their local memory but can only cooperate with other processes via coordinator objects.

Whereas writing and reading accesses to local objects occur in a conventional way, a special access model exists for the coordinator objects, this being explained by way of example in the following section.

2. Introductory Description of the Coordinator Object Access Model

Coordinator objects are in two different statusses in alternation: the write states (writeable) and the read status (readable). When generating the coordinator objects, these are in the write status.

Read accesses block in the write status and write accesses block in the read status. Blocking thereby denotes that the corresponding process is displaced (put to sleep), namely at least until the point in time of switching into the opposite status.

The diagram (transition network) of FIG. 2 illustrates this behavior. The following notation is thereby employed:

Events or logical conditions are noted above the edges of the transition network. The labelling under the edges expresses actions that are to be implemented when migrating across the corresponding edge. The following behavior applies:

Write accesses to a coordinator object that is in the read status are delayed (by blocking the writing process) until (at least) the coordinator objects switches back into the write status. Analogously, reading processes are delayed when the coordinator object is in the write status. For this reason, no edges occur in the transition network for read accesses in the write status or for write accesses in the read status.

Blocked writing processes are awakened when the write status is reached again and blocked reading processes are awakened when the read status is reached. They then again attempt to implement their access. A blocking can thereby fundamentally arise again (if the status has already changed again due to actions of another process). Then the processes again behave as described above.

The switching between the two statusses is triggered by the occurrence of switch conditions. Switch conditions are defined by the specification of access patterns and the previous sequence of accesses with respect to this access behavior. The access pattern is statically specified for each coordinator object by the user (programmer). The specification strategy is defined by answers to the following questions:

Which processes write a coordinator object how often before it is enabled for reading?

Which processes read a coordinator object how often before it is enabled for writing?

Access patterns are therefore defined for each access type (writing or reading); thus, for example, a write access pattern 'write(each(wGroup,2))' denotes that the coordinator object is enabled for reading as soon as every process of the group of processes defined by wGroup (process group) has written the coordinator object exactly twice. The read access pattern 'read(arbitrary (5))' denotes that the read condition is left as soon as exactly five read accesses of arbitrary processes to the coordinator object have occurred. The same process is thereby also allowed to access multiply. There are even more access patterns (see below).

The access patterns define a respective write or read phase. These phases can alternate arbitrarily often (as soon as the switch conditions apply). At the start, the coordinator objects are always in the write status, i.e. the first phase is always a write phase.

A full cycle—composed of a write and of a read phase with terminating, renewed transition into the write status—is called a calculation step as described below. A pair of access patterns, for example '(write(each(wGroup,2)), read (arbitrary(5)))', thus defines the execution of a calculation step by indicating the switch conditions for write and read phase.

Said access pattern ((write(each(wGroup,2)), read(arbitrary(5))) can be illustrated on the basis of a refined transition network (FIG. 3). We assume therefor that the process group wGroup is composed of two processes $p_1$ and $p_2$ with $p \in \{(p_1, p_2)\}$ and that read processes $q \in \{(q_1, \ldots q_n)\}$ exist.

Notation (FIG. 3): The notation access| condition states that the edge is only crossed given the corresponding access when the condition is previously met.

Given the access pattern for write accesses, the switch condition is specified by the particular of the keyword 'each' as a condition that must be valid for every one of the participating processes.

When the switch condition is already met (writecount (p)==2) in this case, for example for the process p, then further write accesses of this process are likewise delayed even though the coordinator object is in the write status. Since such a write access can be executed no earlier than in the next write phase, process p is likewise only reawakened at the beginning of this phase. (It follows therefrom that there is no edge in the above transition network for the case write(p) | writecount(p)==2!).

Given the access pattern for read accesses, the keyword 'arbitrary' means that neither the number of the accessing processes nor the contribution of each individual process is defined for meeting the switch condition but only the total number of accesses.

The initialization of a status contains, among other things, that the counters 'writecount(p)'—one respective counter per process for the write status—or, respectively, 'readcount'—a common counter for the read status—are set to 0.

The above transition networks are incomplete: It is not specified what occurs when conditions do not apply or accesses occur "in the wrong status". This shall be discussed later.

3. Access Patterns

Access patterns make it possible for the programmer to express the interactions between processes on a level that is very close to the behavior of the (abstract) algorithm. The access patterns are described separately for the two access types of write and read; the following access patterns are respectively available:

each(processGroup, numberOfAccesses)
each(processGroup)
arbitrary(numberOfAccesses)
arbitrary( )

As already mentioned, the status switch condition given an 'each' pattern must be met by every individual process from the process group processGroup. A process group is thereby a set of processes that must be known no later than the initialization time of the coordinator object and whose composition dare no longer change after this point in time. The specific fashioning of a corresponding data type is left up to the respectively implementation. Accesses of processes that do not belong to the process group are not allowed.

Given an 'arbitrary' pattern, the set of access-authorized processes is not restricted, it therefore likewise need not be indicated.

When an access pattern contains a 'numberOfAccesses' particular (an integer data type), then the switch condition is met when the indicated plurality of accesses has been implemented—by each process of the specified group given an 'each' pattern; the sum of the accesses of all processes counts given an 'arbitrary' pattern.

When, by contrast, a number of accesses is not specified, then the switch conditions must be determined by the processes themselves. The switch condition for an access phase phase specified by 'each(processGroup)' is met when each process of the group has implemented exactly one 'procReadyWith(phase)' instruction. Given an 'arbitrary( )' specification, the switch condition is produced by exactly one 'switchFrom(phase)' instruction of an arbitrary process.

3.1 Different Access Patterns

With their access patterns, coordinator objects describe different versions of write-reader (generator-user) scenarios. Some of these versions are described below.

The syntax of a coordinator object declaration coordinator ... employed here was selected with the goal of readability; alternative syntaxes are, of course, conceivable. A specific parallel (access) behavior is respectively compelled by the following access patterns for the coordinator object variable 'object' of the type 'some Type':

coordinator <someType> object (write(arbitrary(1)), read (arbitrary(1)));

The variable 'object' is written and read respectively once in alternation. This behavior can be employed, for example, for handing over access rights to exclusive operating means.

coordinator <someType> object (write(each(group1,1)), read(each(group2,2)));

The processes from the group 'group' write the variable 'object' in common. When each process has made its contribution, the variable is read by all processes of the group 'group2' (this is frequently identical to group1) exactly twice before it is enabled again for writing. Given such an access pattern, the variable 'object' is typically a structured quantity, for instance a vector, that is processed by the processes in SPMD (single program multiple data) mode.

coordinator <someType> object (write(each(group1,1)), read(each(group2)));

Writing here is carried out in exactly the same way as above; however, how many times each participating process writes is not determined. Writing is only carried out again after each process from group2 has executed the instruction "procReadyWith(read)' in order to signal that it has ended its read phase. Such a coordination of the read processes is appropriate, for example, when the read processes implement different hinds of calculation with 'object'.

coordinator <someType> object (write(arbitrary( )), read (each(group2)));

Here, reading is carried exactly as above. No determination to any process or a process group occurs given writing; a specific number of accesses is also not demanded. Reading is only carried when some process or other executes the instruction 'switchFrom(write)'. Such a write pattern can be employed when a main process supervises the work of a variable plurality of (writing) processes that implement different parts of the overall calculation and, thus, different numbers of write accesses.

coordinator <someType> object (write(,,,), read(arbitrary (4711)));

Here, writing is only carried out again when reading was carried out 4711 times.

4. Freedom from Conflict

Coordinator objects not only coordinate writing and reading operations relative to one another but also fundamentally prevent simultaneous accesses to the same object. When two writing accesses pend, they are executed strictly successively and are not interwoven. Inconsistent statusses that could arise due to this interweaving are thereby avoided. We thus always proceed on the basis of atomic accesses to coordinator objects.

This property enables reliable parallel programming. On the other hand, atomicity can be too strict for certain accesses: Inefficiency arises due to the sequentialization, this being avoidable when one knows that no conflicts at all can arise in reality. In general (not always!), thus, reading accesses are conflict-free. Writing accesses can also be conflict-free when writing is carried out onto different parts of structured objects.

Users of coordinator objects can inform the system of freedom from conflict. For write accesses, this occurs by specification of 'nonconflictWrite( . . . )' instead of 'write( . . . )'. Freedom from conflict is assumed as a standard for read accesses, so that the user must specify 'exclusiveRead( . . . )' instead of 'read( . . . )' in order to obtain atomicity of the read accesses. A program example with such specifications is recited in the Appendix.

5. Programming Language Integration

Coordinator objects can be integrated in any language; the language used in this specification is C++. However, it is critical that reading accesses can be distinguished from writing accesses. How this occurs is unimportant here. For example, the access types can be pre-defined for pre-defined functions to standard types; for user-defined functions and types, a specific user declaration can make it possible to distinguish between writing and reading operations. Let an example of a possible syntax for such specifications be provided for the coordinator access function sqrt employed in the following programming example:
coordination float sqrt(read float);
The specification of the keyword 'read' determines that a coordinator object that is assigned the function sqrt as a first (and only) argument is read by this function call.

6. Programming Example

A simple example from the field of numerics, the normalization of a vector, is considered:
A predetermined vector v is to be brought to length 1 and retain its direction in the n-dimensional space. A sequential program that implements the calculation looks like this in C++:

```
int vsize = v.size();                    // the length of the vector
float sum = 0;                           // for calculation of the scalar product
for(int i = 1; i <= vsize; i++)
    sum+= v[i] * v[i];                   // calculate scalar product
float norm = sqrt(sum);                  // calculate norm by taking the
                                         square root
for( i = 1; i <= vsize; i++)             // all components of v
    v[i] /= norm;                        // are divided by the norm
```

This program can be parallelized in that the vector is subdivided into strips and each strip is processed by a different process. Each process calculates a part of the scalar product; the partial sums are then added (in common). As soon as this value is available (i.e. when each process has attached its partial sum), each process can carry out the norm calculation and division (actually, the calculation of the norm only has to occur once, which is not done here for the sake of simplicity). A very frequently occurring access pattern derives: For calculation of the overall scalar product, a coordinator object is declared that is written exactly once by each process before it is allowed to be read. This likewise occurs exactly once per process but is not critical here since the coordinator object is not written again here after the reading.

Here, the unit of the parallel execution is the function 'normalize'. This has the lower and upper boundary of the sub-vector that is to be handled as well as a reference to the entire vector as parameters. The function is called by the participating processes with respectively suitable lower and upper indices. The programming of the process generation and work distribution is not co-indicated here because it is not significant for the understanding of the programming with coordinator objects.

```
coordinator<float> dotProd
    (write(each(allProcs,1)),
    read(each(allProcs,1)));
void normalize(int myLower, int myUpper, vector& v) {
    float partial = 0;
    for 9intj = myLower; j <= myUpper; j++)
        partial += v[j] * v[j];               // calculation of scalar
                                              sub-product
    collectiveAdd(dotProd,partial);           // cumulative addition
                                              to coordinator
                                              objects float norm = sqrt(dotProd);               // each process reads
                                              the coordinator object for (j = myLower; j <= myUpper; j++)
        v[1] = v[1] / norm;                   // norming by division
    return;
}
```

This example shows how a controlled access to 'dotprod' occurs without any and all programming of synchronization or communication. To this end, the user-defined function 'collectiveAdd' is specified as a write operation with respect to its first argument—as collective write operation to be more precise. Collective operations are explained in greater detail in the following section.

The global switch condition that triggers the transition into the read status and thus allows reading by the function 'sqrt' is only valid when all processes have written their part by calling 'collectiveAdd'. The following transition from the read status into the write status has no practical effects here because the program fragment is ended. If it was executed within a loop, the switching from the read status into the write status would likewise take effect.

7. Collective Write Operations

Collective operations (also partly called reduction operations) are particularly utilized in the field of scientific computing (see, among others, A. Geist, A. Beguelin, J. Dongarra, H. Jiang, R. Manchek, V. Sunderam: PVM 3.0 Users Guide and Reference Manual, Oak Ridge National Laboratory, 1993; The MPI initiative, netlib@ornl.gov, 1994; R. Butler, E. Lusk, Monitors, messages, and clusters: The p4 parallel programming system, Parallel Computing 20, 1994; D. Culler, SPLIT C, //http.cs.berkeley.edu/~culler, 1996 and often allow a significantly simplified notation of algorithms when the value of an object must be repeatedly initialized. Coordinator objects offer support for collective operations in a very simple way by an automatic re-initialization at the respective beginning of a write phase.

To this end, a coordinator object implementation must make a generic function 'collective' available to the user that makes it possible to also defined user-defined collective operations—the function 'collectiveAdd' used in the above example—, for example in the following way:

```
float collectiveAdd (coordinator<float> & result, const float arg) {
    return collective(operator+,result,0,arg);
}
```

-continued

The signature of the function 'collective' is established by:
template <class T> T & collective {
   T (*f) (T,T),
   coordinator<t> & result,
   T initValue,
   Targ);

The semantics of 'collective' can be described in the following way:
- A call of 'collective' implements a memory access to the argument 'result'.
- When a call of 'collective' is the first call within a write phase, then the new value of the coordinator 'result' derives as result of the function call 'f(initValue,arg)'.
- In following calls, the new value of the coordinator 'result' derives as result of the function call 'f(result, arg)'.
- With respect to 'arg', 'collective' is defined as read access; no coordinators dare be handed over as arguments 'f' and 'initValue'.

8. Semantics and Implementation of Coordinator Objects

Access patterns define a parallelism behavior that can be referred to best as an automatic coordination. This behavior is described in greater detail below. First, the semantics of coordinator objects is presented on the basis of a central contol program for a coordinator object. This represents a minimum demand of every implementation of coordinator objects. Implementation versions are discussed subsequently.

8.1 A Central Control Program for a Coordinator Object

A central control program for a coordinator object that defines the semantics of the coordinator object is presented below. An instance of this program exists conceptually for each coordinator object. Implementations are allowed to combine the tasks of a plurality of such instances in a program or to distribute the tasks of the control program to a plurality of cooperating programs. In systems with a shared memory, the communication with the control program described below can also occur without explicit message exchange when it is implemented in some other way. However, the logical execution—except for time non-determinisms—should remain the same due to such changes.

8.2 Event-Controlled Functioning

For introduction into the functioning of the control program, the various possible accesses of a process to a coordinator object are described in the following sections on the basis of flowcharts. These show the communication with the control program (control program) respectively occurring in conjunction with an access. The messages to the control program are also referred to as events below. First, we shall show the basic pattern for the communication connected with an access, FIG. 4.

The process being considered sends a request (requireAccess) to the control program and waits for the request confirmation of the control program before it continues its program execution. From the point of view of the process, this execution thus behaves like a 'remote procedure call (rpc)'. The control program registers the request as an event. The event is possibly delayed when it cannot be immediately processed in the momentary status of the coordinator object. To this end, the control program administers the events as four different event sets that are described in greater detail later.

When an event is finally selected for processing, then the control program initially executes a few event-related activities, what is referred to as the prologue. Given a distributed memory, the prologue contains the offering of the coordinator data at the requesting process, among other things. Subsequently, the request confirmation (rpcFinish) is sent to the requesting process, so that the latter can continue. When the following code of the process contains accesses to the coordinator data, then a termination message (accessDone) to the control program must ensue after the end of these accesses so that it can implement the terminating event-related activities—the epilogue. The requesting process need not wait for the conclusion of the epilogue since every further access to the coordinator object presumes a new request to the control program.

Prologue and epilogue are not explicitly shown in the other diagrams (FIGS. 5–8). By way of example, time-meshed accesses of a further process (concurrent process) are shown that influence, i.e. delay, the executive sequence behavior of the process under consideration (process of interest).

8.2.1 Reading or, Respectively, Writing Access

The diagram, FIG. 5, shows a reading access (requireAccess(read)), but is analogously valid for writing accesses (requireAccess(write)). The accessing process is only allowed to access when it has received the confirmation (rpcFinish) of its access request from the control program. It is assumed in the diagram that the read accesses are exclusive, for which reason a wait (1) is implemented for the end of the already started, competing access before the confirmation.

The control program must be informed of the end of the access (accessDone), as a result whereof potentially delayed events proceed to processing (2).

8.2.2 The procReadyWith Instruction

The 'procReadyWith' instructions signals the coordinator object that the calling process has ended its part in a write or, respectively, read phase. It is only meaningful and allowed when an 'each( . . . )' access pattern was declared for the corresponding phase. Given an access pattern 'each (group, numberOfAccesses)', the process is potentially ended for the process before reaching the declared number of accesses 'numberOfAccesses', i.e. all further accesses are delayed until the next time the appertaining phase is reached. Since the procReadyWith instruction does not involve an access to the coordinator object by the requesting process, the communication protocol is simpler here: The 'access-Done' message to the control program can be omitted.

The exemplary diagram, FIG. 6, shows the communication execution of a 'procReadyWith' instruction for the read phase. The calling process must be delayed at least until the coordinator object is in the status to which the instruction refers—this is the read status in the example that is reached (1) here by a 'procReadyWith' instruction of the competing process. Such a waiting situation can occur, for example, when, following the end of its write phase, the process does not implement a single read access to the coordinator object in the following read phase but immediately ends its read phase with the 'procReadyWith' instruction. A following write access is delayed until the coordinator object again switches (2) into the write status, see FIG. 6.

8.2.3 The SwitchFrom Instruction

By contrast to the 'procReadyWith' instruction, the 'switchFrom' instruction is a global status change signal. The status of the coordinator object changes after the end of all accesses already begun. The instruction is allowed for all access patterns; given access patterns with counter, the status also changes when the declared number of accesses has not yet been reached in the momentary phase.

The diagram, FIG. 7, shows the communication execution of a 'switchFrom' instruction for the read phase. A following write access is delayed until the momentary read access of the other process has ended, since the status of the coordinator object does not change (1) until this point in time.

A delay by the control program is also possible given the 'switchFrom' instruction, and the confirmation of the control program is therefore required, for example when a process that accesses the coordinator object exclusively in reading fashion successively implements two 'switchFrom' instructions without having implemented a read access in the interim.

8.2.4 The Release Instruction

The 'release' instruction ends the coordination of the data supervised by the coordinator object. These data are made exclusively available to the calling process (as return value of the 'release' instruction). The process must therefore wait until the phase indicated in the instruction has been ended—in the example, this occurs by ending the read access of the competing process (1). The conclusion of a 'release' instruction is the last allowed action of the control program, i.e. every further access of an arbitrary process to the coordinator object is viewed as an error, FIG. 8.

8.3 Event Processing by the Control Program

The above accesses (events) can alternate arbitrarily within a process (with the exception, of course, of the 'release' instruction). The control program will delay the process at every event as long as it is allowed according to the access pattern specified for the coordinator object. In order to enable this, the control program administers the events arriving from the various processes in four different event sets, which are described below. The term "sets" (and not "waiting queues") is intentionally used here since it is assumed that the processing sequence of existing events is arbitrary.

8.3.1 The Set of Active Events

This set contains all events not yet processed that are pending for processing at the moment. These are either "new" events (that were never yet considered by the control program) or events that, due to processing of an event from one of the waiting sets listed below, were transmitted anew into the set of active events. The control program takes a respective event from the set of active events by calling the procedure 'nextEvent'. The procedure waits given an empty set, potentially until a process generates an event. The method according to which the event to be taken is selected given a plurality of existing events is left up to the implementation. A possible prioritizing of the taking is as follows:
1. 'accessDone' events in order to enable further exclusive accesses or a status change;
2. 'switchFrom' events since this signals that a phase is ended overall;
3. 'procReadyWith' events since a process has met its sub-task—a phase change can be potentially accelerated;
4. 'requestaccess' events—given a distributed memory, only those of processes that already have the coordinator data locally present—as a result whereof unnecessary data exchange can be avoided;
5. other 'requestAccess' events;
6. 'release' event.

8.3.2 Set of Events that can be Processed in the Next Write Phase

All events for which the control program determines that they can be processed (at the earliest) in the next write phase are accepted into this waiting set by a call 'delayForPhase (write,event)'. Given the next transition of the coordinator object into the write status, all events collected in this set are transferred back into the set of active events by calling 'enableEventsDelayedForPhase(write)'.

8.3.3 Set of Events that can be Processed in the Next Read Phase

Analogous to the set just cited, there is the waiting set for the read phase. Events are added by 'delayForPhase(read, event)' and, given transition into the read status, are transferred back into the set of active events by 'enableEventsDelayedForPhase(read)'.

8.3.4 Set of Events that Require Exclusive Coordinator Access

In addition to the events that must be delayed until a following phase, there is a set of 'requireAccess' events that can still be processed in the momentary phase but only after an exclusive access or another process that has already begun has ended. The procedure 'delayForExclusiveAccess (event)' serves for adding an event to this set. After the end of an exclusive access, the events collected in this set since the beginning of the access are re-activated by 'enableEventsDelayedForExclusive'.

8.4 Variables that Describe the Status of the Coordinator Object

The control program works with a number of variables that describe the momentary status of the coordinator object. These variables are listed here with their initial values:

pendingAccesses=0;
  Number of processes that are allowed access to the coordinator object at the moment. The value of the variable must be 0 at a phase change. When accesses of a phase are not free of conflict, 'pendingAccess' is maximally allowed to have the value 1.

globalReady=false;
  This is a flag that indicates whether the status of the coordinator object changes (true) after the conclusion of accesses already begun or whether further events must be processed (false) before the change.

globalcount=0;
  In case of 'arbitrary(numberOfAccesses)' access patterns, this variable serves as global counter of the accesses in a phase.

procReady[ ]={false, . . . ,false};
  In case of 'each( . . . )' access patterns, this table of flags indicates for every process of the appertaining process group whether the respective process has ended its write or, respectively, read phase.

procCount[ ]={0, . . . ,0};
  In case of 'each(group,numberOfAccesses)' access patterns, this table contains the process-related access counters.

releaseByProcess=∅;
  This variable is set when processing a 'release' event and then indicates the process to which the data supervised by the coordinator object are made available given termination of the momentary phase.

notWritten=true;
  This flag serves for supporting what are referred to as collective operations. At the beginning of a write phase, the variable respectively receives the value 'false' in order to inform the first write within the phase that it is the first. An automatic re-initialization of the coordinator value in every write phase is enabled as a result thereof.

8.5 Notation

The operational semantics definition is provided in the form of pseudo-code that is based on C or, respectively, C++ notation. However, the semantics of some additionally employed constructs must still be explained:

forall id in group: block
executes 'block' for every process of the process group 'group' once; the execution, however, is not continued for further processes when the control flow (for example, due to return) leaves the 'block'. In the 'block', the variable 'id' is linked to the respectively processed process.
match (object) {
   fits pattern: block
   fits pattern
   or pattern: block
   . . .
}
implements a pattern comparison (pattern matching) with respect to 'object'. A component part of a pattern can be constant values (identified by quotations (for example, 'EACH'), that must then correspond to the corresponding value in 'object' (for example, EACH) or, on the other hand, variables to which the corresponding values of the predetermined pattern 'object' are linked. The appertaining 'block' is executed for the first successful comparison.

Such a pattern comparison is, among other things, implemented with the access pattern of the coordinator objects valid for the respective access phase 'phase' that is respectively supplied by the function 'accessSpec(phase)'. The possible patterns are:
(EACH,processGroup,maxCount)
(EACH,processGroup)
(ARBITRARY,maxCount)
(ARBITRARY)
The values 'processGroup' and 'maxCount' are thereby linked to the variables indicated in the matching pattern in order to be able to access them within the 'block'.

In the program context, an event is interpreted as a structured data type that must have the following components available to it:
eventSpec
   the type of event, i.e. one of the values 'requireAccess', 'accessDone', 'procReadyWith', 'switchFrom' or 'release';
process
   the accessing process, i.e. the process that generated the event;
phase
   the phase for which the event is intended, i.e. either 'write' or 'read';

8.6 The Control Program

The meaning of some of the functions/procedures employed were already explained. These and a few other procedures are not specified by pseudo-code. They are either self-explanatory due to their naming or are yet to be addressed in the following discussion of the implementation. All functions/procedures for which a pseudo-code specification exists are emphasized by bold face given their employment.

```
mainLoop {
    while (true) {                               // endless loop write-read cycle
        initForPhase(write);                     // set initial status for write phase
        enableEventsDelayedForPhase(write);
        doPhase(write);                          // implement the write phase
        initForPhase(read);                      // set initial status for read phase
        enableEventsDelayedForPhase(read);
        doPhase(read);                           // implement read phase
    }
};
initForPhase(phase) {      // produce the initial status of the coordinator object for the
                                              phase to be implemented (write or read)
    match(accessSpec(phase)) {
        fits ('EACH', processGroup,maxCount) : {
            globalReady = false;
            forall process in processGroup: {
                procReady[process] = false;
                procCount[process]= 0;
            }
        }
        fits ('EACH',processGroup): {
            globalReady = false;
            forall process in processGroup: {
                procready[process] = false;
            }
        }
        fits ('ARBITRARY',maxCount): {
            globalReady = false;
            globalCount = 0;
        }
        fits ('ARBITRARY'): {
            globalready = false;
        }
    }
    if (phase == write) {
        notWritten = true;                       // is used for collective write operations
    }};
doPhase(phase) {
                                              // processing of events within a write/read phase
    while(!checkSwitchCondition(phase)) {
                                              // process the next existing or arriving event
```

-continued

```
event
    ProcessEvent(phase,nextEvent());
}
if (releaseByProcess != ø) {
                // enable data of the coordinator object and end the control program
    if (distributed MemoryImplementation( )) {
                // potentially copy the data (from the last accessor) to the process
    provideDataFor(releaseByProcess);
    }
    rpcFinished(releaseByProcess);
    exit;
}};
boolean checkSwithCOndition(phase) {
            // check whether all conditions for ending the current phase are given
    if (pendingAccesses > 0)                    // ongoing accesses ended first
        return false;
                                                // test global switch condition
    else if (globalReady) {
        return true;                // switchFrom event or global maxCount reached
    }
            // test local switch conditions (procReady or maxCount reached?)
    else {
        match(accessSpec(phase)) {
            fits ('EACH',processGroup,maxCount)
            or ('EACH',processGroup) : {
                forall process in processGroup: {
                    if (!procReady[process])
                                    // local switch condition not met for a process
                        return false;
                }
                return true;        // local switch condition met for all processes
            }
            fits ('ARBITRARY',maxCount)
            or ('ARBITRARY') : {
                                    // there are no local switch conditions
                return false;
            }
        }
    }
};
processEvent(phase,event) {
            // processing an event. This is either used, i.e. the request of a process
            // is granted and the process is potentially informed of the grant
            // or the processing of the event is delayed and processed anew later
            // by processEvent
    match (event.eventSpec) {
        fits 'requireAccess': {
            if (!checkDelay(Phase.event)) {
                accessProlog(event.process,phase);
                        // Reactivate process for access to coordinator data.
                if (phase == write) {
                            // Flag for collective write operations must be observed
                    rpcFinish(event.process, notWritten);
                    notWritten = false;
                }
                else {
                    rpcFinish(event.process);
                }
            }
        }
        fits 'accessDone': {
                    // The end of an access is never delayed since accesses
                    // are always ended in the phase in which they were begun
                    // (checkSwitch Condition waits for this)
            accessEpilog(event.process,phase);
            // Process does not wait for confirmation.
        }
            fits 'procReadyWith': {
                if (!checkDelay(phase,event)) {
                setProcessReady(event.process,phase);
                        // Process is allowed to continue after processing of the event.
                rpcFinish (event.process);
                }
            }
            fits 'switchFrom': {
                if (!checkDelay(phase,event)) {
                                            // set the global switch condition
```

```
                    globalReady = true;
                            // Process is allowed to continue after processing of the event.
                    rpcFinish (event.process);
            }
        }
        fits 'release': {
            if (!checkDelay(phase,event)) {
                                                            // set release flag
                releaseByProcess = event.process;
                            // Process is allowed to continue only after the end of the phase.
            }
        }
    }
    ;
    setProcessReady(process,phase) {
                    // Reaction to 'procReadyWith' event; potentially set the process-local
                    // switch condition
        match(accessSpec(phase)) {
            fits ('EACH', processGroup, maxCount)
                or ('EACH',processGroup) : {
                    procReady[process] = true;
            }
            fits ('ARBITRARY',maxCount)
                or ('ARBITRARY') : {
                    error("'procReadyWith' not allowed for 'arbitrary' patterns");
            }
        }
    };
    accessEpilog(process,phase) {
                                // necessary administration tasks given end of an access
        pendingAcceses-;
        if (exclusiveAccessRequired(phase)) {
                    // coord was blocked because the accesses of this phase
                    // are not free of conflict (see checkDelayForExclusiveAccess)
                    // all events waiting for data access are re-activated
                    // (implementations can, of course, optimize)
            enableEventDelayedForExclusiveAccess();
        }
56 ;
    accessProlog(process,phase) {
                                // administration tasks necessary before an access
        if (distributedMemoryImplementation()) {
                    // potential copying of the data (from the last accessor) to the process
            provideDataFor(process);
        }
                    // The counters must be incremented before the access so that
                    // so that further accesses are not erroneously allowed
                    // before the end of an access.
pendingAccesses++;
updateCounters(process,phase);
                    // the asking (waiting) process can now be allowed to access the
                    // effective data (this occurs by rpcFinish())
}
;
updateCounters(process,phase) {
                    // log an access, i.e. potentially increment the global or
                    // process-local counter, and check whether the global
                    // or process-focal switch condition is met due to the access
        match(accessSpec(phase)) {
            fits ('EACH',processGroup,maxCount) : {
                procCount[process]++;      // increment access count for current process
                if (procCount[process] == maxCount) {
                        procReady[process] = true;            // set local switch condition
                }
            }
            fits ('ARBITRARY',maxCount) : {
                globalCount++;                               // increment global access count
                if (globalCount == maxCount) {
                    globalReady = true;                      // set global switch condition
                }
            }
            fits ('EACH', processGroup)
                or ('ARBITRARY') : {
                                // there is no counter; i.e. nothing to do, either
            }
        }
    };
```

-continued

```
boolean checkDelay(phase,event) {
                // check whether there is a reason for the delay and implement
                // the delay, potentially by entry into one of three waiting sets.
    if (checkDelayForOtherPhase(phase.event)) {
                                // request is not intended for the current phase
        return true;
    }
    else if (checkDelayForExclusiveAccess(Phase.event)) {
                                // Exclusive access is not possible at the moment
        return true;
    }
    else {
                    // no delay of the event is necessary
        return false;
    }
}
;
boolean checkDelayForOtherPhase(phase event) {
            // Check whether the event can be processed in the current access
            // phase of the coordinator object s [sic]; if not, then the event is placed
            // into the waiting queue for events of the other phase, i.e. the
            // the processing of this event is attempted again at the next phase change.
    if (event.phase != phase) {
        delay ForPhase(event.phase,event);
        return true;
    }
    else {
        return false;
    }
}
;
boolean checkDelayForNextSamePhase(phase,event) {
            // Check whether the processing is still allowed in this phase; if not,
            // a wait must be carried out until the next but one (same) phase, i.e.
            // the event is put into the waiting queue for events of the current
            // phase whose processing is attempted again in the phase change
            // after the next.
            // This is also true for 'procreadyWith' and 'switchFrom' events, i.e. the
            // the user must take note that only one 'switchFrom' event occurs per
            // phase or one 'procReadyWith' event occurs per process.
    match(accessSpec(phase)) {
        fits ('EACH',processGroup,maxCount)
            or ('EACH',processGroup): {
            if (!(member(event.process,processGroup))) {
                error ("process is not allowed to access the coordinator");
            }
            if (globalready ||
                procReady[event.process]) {
                    delayForPhase(phase,event);
                    return true;
            }
            else {
                return false;
            }
        }
        / . . .
        // . . .
            fits ('ARBITRARY',maxCount)
                or ('ARBITRARY') : {
                if (globalReady) {
                    delayForPhase(phase.event);
                    return true;
                }
                else {
                    return false;
                }
            }
        }
    }
}
;
boolean checkDelayForExclusiveAccess(phase,event) {
            // check whether exclusive access to the coordinator object is necessary
            // for the request; if yes, the event must be delayed when another process
            // is currently accessing the coordinator object. The Event is then placed
            // into a waiting queue of events whose processing will be attempted
            // again at the end of the current access.
    match (event.eventSpec) {
        fits 'requireAccess': {
```

-continued

```
        if (exclusiveAccessRequired(phase) &&
            pendingAccesses > 0) {
                        // Data are blocked since an exclusive access that has already
                        // begun exists at the moment
                delayForExclusiveAccess(event);
                                        // wait until access ended (in this phase)
                return true;
        }
        else {
                        // access not exclusive or no begun access at the moment
                return false;
        }
    }
    fits 'accessDone': {
                // is never delayed (this case does not occur, see processEvent)
        return false;
    }
    fits 'procReadyWith'
        or 'switchFrom': {
                // These events are not delayed by ongoing exclusive accesses.
                // Following 'requireAccess' events are potentially no longer
                // allowed in this phase. However; wait for the end of all ongoing
                // accesses for the phase change
        return false;
      }
    }
}
```

8.7 Architecture-Dependent Implementation of Coordinator Objects

Every implementation must first realize the communication of the processes accessing the coordinator object with the control program, including the blocking of the processes waiting for an answer. In architectures with shared memory, this will typically occur by synchronized accesses to a shared memory area as well as the respectively offered means for process control (locks, signals, etc.); by message exchange with blocking reception routines for the waiting processes in architectures with distributed memory.

In architectures with distributed memory, a coordinator object implementation must, however, additionally see to it that the processes—as soon as they have received the permission from the control program to access the coordinator data—respectively encounter a consistent copy of these data in their local memory. This task is expressed in the above semantic specification by calls of the function 'provideDataFor' and contains the exchange of messages that, in addition to containing internal coordinator status information, particularly contain the current value of the data object visible for the user. A coordinator object implementation thus assures an automatic data migration between the processes.

The exact semantics of such a migration must be observed, particularly given complex user-defined data types that contain pointers or references to other objects:

Which of the components of a structured data type are considered in the transmission to another process?

Does the recipient of a message interpret these data in a way that is consistent with the interpretation of the sender?

Is the property of an object that two sub-components are pointers or references to one and the same object also met after a migration of this object?

The first two points can generally not be decided by the system alone; rather, user support is necessary in order to be able to correctly implement the conversion of user data into the internal exchange format as well as the reverse conversion at the recipient side. This procedure is often referred to as data marshalling and must be supported by the system insofar as a correct conversion of the basic data types is possible. The conversion of the basic data types then forms the basis for the specification of conversion routines for user data types (regarding the topic of data marshalling, see, among others, Open Software Foundation: DCE Application Development Guide.

The property addressed in the third point is also referred to as intra-object sharing and is a property that must be assured by the coordinator object implementation by itself. Intra-object sharing, including the implementation aspects connected therewith, is discussed in M. Herlihy, B. Liskov: A Value Transmission Method for Abstract Data Types, ACM Transactions on Programming Languages and Systems Oct. 4, 1982.

The entire administration of the status of the coordinator objects occurs by the system. In the distributed case, this means that coordinator object status information is kept consistent between different process spaces. The independent processes always behave as though the coordinator objects lay in a (virtual) shared memory; except for possible semantic deviations due to the (user-defined!) data marshalling, the user sees no difference between the two models.

Appendix A: A More Extensive Example

A method for the iterative solution of linear equation systems, the conjugated-gradient method (cg-method) is considered. The following C++ program sequentially implements the cg-method in an obvious way. Proceeding from an initial approximation, the vector x is modified in the body of the function until the equation $A*x=b$ (A and b predetermined) is solved adequately exactly. The operations utilized are vector-vector, matrix-vector and vector-scalar operations. In particular, scalar products are frequently calculated.

```
void cgm(const matrix& A, const vector& b, vector& x) {
  vector p = b - (A * x);
  vector r = p
  int i;
  for ( i = 1; i <= A.widt( ) ;i++) {
    if((p * p) < limit) return;              // compute pp
    double respective = r * r;               // compute rr1
    vectorAp = A * p;                        // compute Ap
    double a = respective / ( p * Ap);       // compute pAp
    x += (p * a);                            // compute x
    r -= (Ap *= a);                          // compute r
    double bk = (r * r) / respective;        // compute rr2
    p = r + (p * bk);
  };
  return;
)
```

This program can be parallelized in that the required vectors and the matrix (logical) are cut into strips that are handled by different processes. Each of the processes implements the function cgm on its own data area. Individual results, however, are required by all processes, particularly the scalar products. In order to be able to access this in controlled fashion, these are declared as coordinator objects. The same is true of the vector fullP that is written and read by all processes.

The "strips" are modelled as vector sections and matrix sections. Sections are administration structures that contain an upper boundary and a lower boundary of a sub-vector or of a sub-matrix as well as the complete vector and/or the complete matrix itself.

For understanding the following parallel algorithm, it is meaningful to initially ignore the coordination. The parallelization idea (the parallel strips or, respectively, sections) should be in the foreground. The above-recited sequential algorithm is only modified insofar as some operations become two-stage: first, a strip is operated upon, then the strips are handled in common. (collectiveAdd).

```
void cgm(const matrixSection& A, const vectorSection& b,
    vectorSection& x,              // sub-vector that is modified
    vector& fullX,                 // the entire vector is additionally read
    Group& workers)
{
  vectorSection  localP = b - (A * fullX);
  vectorSection  r = localP;
    // Coordinator declarations: (ignore at first read)
    coordinator <double> pp (write(each(workers,1)),
  read(each(workers,1)));
    coordinator <double> respective (write(each(workers,1)),
  read(each(workers,2)));
    coordinator <double> pAp (write(each(workers,1)),
  read(each(workers,1)));
    coordinator <double> bk (write(each(workers,1)),
  read(each(workers)));
    coordinator <vector>
  fullP(write(each(workers,1)),read(each(workers,1)));
      for(int i = 1; i <= A.width( );i++) {
        double localPp = localP * localP;
        collectiveAdd(pp,localPp);
        if (pp < limit) return
        double localRr = r * r;
        collectiveAdd(rr,localRr);
        fullP.assemble(localP);
        vector Ap = A * fullP;
        double localPAp = (p * Ap);
        collectiveAdd(pAp,localPAp);
        double a = rr / pAp;
        x += (p * a);
        r -= (Ap *= a);
```
```
        double localBk = (r * r);
        collectiveAdd(bk,localBk);
        p = r + ( p * bk/rr);
      }
      return;
}
```

Comments

The method 'assemble' copies sub-vectors (the sections localP) into the target vector 'fullP' component-by-component. The function 'colectiveAdd' has already been described.

This algorithm assumes that the section x is sent back at the end of the processing. This occurs automatically by programming models such as, for example, the workpool described in [KnRe96b] but also in DCE[DCE].

It should be noted that rr is read twice per iteration. This is reflected in the coordinator function.

This algorithm contains a great deal of coordination. However, as long as the coordinator objects are ignored, not much of this is visible. This demonstrates the advantage of coordinator objects: parallel algorithms can be developed and coordination can merely be made runnable later by the definition of the correct access patterns. The software development process is thereby critically improved. Nonetheless, the programs can then be efficiently run on both architecture types (shared memory and distributed memory).

Although other modifications and changes may be suggested by those skilled in the art, it is the intention of the inventors to embody within the patent warranted hereon all changes and modifications as reasonably and properly come within the scope of their contribution to the art.

BIBLIOGRAPHY

[BaStTa]
H. Bal, J. Steiner, A. Tanenbaum:
Programming Languages for Distributed Computing Systems ACM Computing Surveys, September 1989,
[BHJLC]
Distribution and Abstract Types in Emerald
IEEE Transactions on Software Engineering SE 13, Jan. 1, 1987
[DCE]
Open Software Foundation:
DCE Application Dvelopment Guide
[HeLi]
M. Herlihy, B. Liskov:
A Value Transmission Method for Abstract Data Types,
ACM Transactions on Programming Languages and Systems Oct. 4, 1982
[mpi]
The MPI initiative
netlib@ornl.gov, 1994
[NiLo]
Bill Nitzberg, Virginia Lo:
Distributed Shared Memory: A Survey of issues and Algorithms
IEEE COMPUTER, vol. 24, no. Aug. 8, 1991
[PVM]
A. Geist, A. Beguelin, J. Dongarra, H. Jiang, R. Manchek, V. Sunderam:
PVM 3.0 Users Guide and Reference Manual
Oak Ridge National Laboratory, 1993

[P4]
R. Butler, E. Lusk
Monitors, messages, and clusters: The p4 parallel programming system, Parallel Computing 20, 1994
[SPLIT-C]
D. Culler
SPLIT C, //http.cs.berkeley.edu/~culler, 1996

What is claimed is:

1. A method of coordinating an execution of processes cooperating with one another to access a common object, comprising:

declaring the common object as a coordinator object;

allocating access patterns that determine sequences of access of the processes to in access the coordinator object;

reciting a sequence of types of access in the access patterns;

determining using the coordinator object whether the access to the common object occurs given an execution of the processes; and determining on a basis of the access patterns and until an access of another process has ended, whether the access to the common object is implemented or postponed.

2. The method according to claim 1, further comprising:

specifying using the access patterns whether a plurality of accesses per access type are handled with priority before an access of another access type.

3. The method according to claim 2, further comprising:

implementing the accesses of an access type in strict succession in order to avoid conflicts.

4. The method according to claim 2, further comprising:

informing the coordinator object that no instances of conflict occur given successive processing of the accesses of the access type so that the accesses are not strictly implemented.

5. The method according to claim 2, further comprising:

counting a number of the plurality of accesses per access type with a counter; and allowing the access of the another process or of the another access type when an allowable number of the plurality of accesses per access type is reached.

6. The method according to claim 1, wherein one of the types of access covers writing accesses and another of the types of access covers reading accesses.

7. The method according to claim 6, further comprising:

switching the coordinator object into a write status or into a read status, wherein an initial status is the write status.

8. The method according to claim 6, further comprising:

initiating switching of the coordinator object from the write status to the read status, or vice versa, using a switch condition set by a keyword.

9. The method according to claim 8, further comprising:

setting the switching of the coordinator object where the plurality of accesses of one access type is met.

10. The method according to claim 8, further comprising:

setting the switching of the coordinator object where a total of the plurality of accesses by different processes is met.

11. The method according to claim 8, further comprising:

setting the switching of the coordinator object where accesses of a group of processes is met.

12. The method according to one of the claim 8, wherein the switching of the coordinator object is determined by the processes.

13. The method according to claim 1, wherein the coordinator object is realized as a central control program dependent on a respective application.

14. The method according to claim 13, wherein the control program administers accesses that cannot be processed in a waiting set.

15. The method according to claim 14, further comprising:

generating the waiting set in the control program for each access type.

16. The method according to claim 14, further comprising:

selecting a next access to be processed from the waiting set.

17. The method according to claim 15, further comprising:

prioritizing one waiting queue so that the accesses of the one waiting queue are processed first.

18. The method according to claim 1, further comprising:

allocating a local memory that cannot be addressed by other processes of a process.

19. The method according to claim 18, wherein given a distributed memory. for processes for which access is allowed, the control program stores data consistent with the coordinator data in a local memory.

20. A method of coordinating an execution of processes cooperating with one another to access a common object, comprising:

allocating access patterns that determine sequences of access of the processes to access the common object;

defining a sequence of types of access in the access patterns;

determining whether the access to the common object occurs; and determining on a basis of the access patterns and until an access of another process has ended, whether the access to the common object is implemented or postponed.

21. The method according to claim 20, further comprising:

specifying using the access patterns whether a plurality of accesses per access type are handled with priority before an access of another access type.

22. The method according to claim 20, wherein one of the types of access covers writing accesses and another of the types of access covers reading accesses.

23. The method according to claim 20, further comprising:

allocating a local memory that cannot be addressed by other processes of a process.

* * * * *